3,637,567
STABLE AQUEOUS EMULSIONS
Marvin M. Fein, Westfield, and Eugene S. Barabas, Watchung, N.J., assignors to GAF Corporation, New York, N.Y.
No Drawing. Filed May 4, 1970, Ser. No. 34,571
Int. Cl. C08d 7/00
U.S. Cl. 260—29.7 U            4 Claims

ABSTRACT OF THE DISCLOSURE

A stable water emulsion of a poly (N-vinyl lactam) engrafted with isoprene and styrene side chains is disclosed.

---

The present invention relates, in general, to stable aqueous emulsions and, in particular, to stable, aqueous emulsions comprising a grafted polymeric N-vinyl lactam containing styrene and isoprene.

Grafted polymers comprising a basic homopolymer chain containing grafted thereon units or a plurality of such units of one or more polymerizable monomers, in chain form, grafted onto the basic homopolymer chain represent an interesting and important development in the resin arts, particularly since such grafted polymers find immediate and practical utility for the resin chemist to utilize them as "building block" resin systems or "module" resin systems which can be employed to "tailor-make" subsequent resin systems to suit specific industrial needs. Grafted copolymers can be made by a variety of polymerization methods including solution, emulsion or bulk polymerization and the like. In the case of polymeric N-vinyl lactams, and particularly polyvinyl pyrrolidone (poly-1-vinyl-2-pyrrolidone), their use has been limited to a great extent to those fields of utility which take advantage of the inherent physical characteristics of polyvinyl pyrrolidone, the most important of which is its water solubility. While this physical characteristic of water solubility has projected polyvinyl pyrrolidone into a position of prominence for such industrial applications as pharmaceutical, cosmetic, textile, lithographic uses, it conversely precluded their use in industrial applications where water-insolubility of the resin is a prerequisite.

Accordingly, it is an object of this invention to provide water-insoluble compositions based on polymeric N-vinyl lactams.

Another object of this invention resides in the provision of stable aqueous emulsions based on N-vinyl lactams.

Yet another object of this invention resides in the provision of stable aqueous emulsions comprising a polymeric N-vinyl lactam containing grafted styrene and isoprene units.

Still another object of this invention resides in the provision of stable aqueous emulsions comprising a polymer of polyvinyl pyrrolidone containing grafted styrene and isoprene units.

Still other objects of the invention will become further apparent as the description of the invention proceeds.

In accordance with the above-defined objects, it has been devised whereby stable aqueous emulsion latices are provided comprising N-vinyl lactam containing styrene and isoprene.

As a result of the invention upon which the present discovery is based, the latices of the present invention find immediate and practical applicability for use as cast films which are transparent, colorless and flexible. The films which are deposited are strong and clear and can be produced directly upon evaporation at room temperatures. Such materials are eminently useful as protective coatings, impregnants and permanent sizing agents for paper, leather and the like. A particularly advantageous feature resides in the fact that the emulsion latices of the present invention can be dehydrated and redispersed on stirring with water, thereby avoiding the cost of shipping water in latices. Still other useful applications of the emulsions of the invention include their use as pastes or dispersions in hot dip coating, slush casting and cellular elastomer applications.

The polymeric N-vinyl lactams utilized in the preparation of the compositions of this invention are characterized by the following general structural formula:

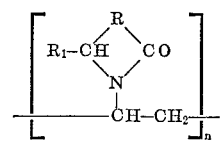

wherein R represents an alkylene bridge group necessary to complete a 5, 6 or 7-membered heterocyclic ring system, $R_1$ represents either hydrogen or an alkyl group, and $n$ represents a number indicative of the extent of polymerization and is usually at least 3 or 4.

All of the specific polymeric materials characterized by the foregoing general formula are commercially available and called polymeric N-vinyl lactams. They are obtained by polymerizing organic 5, 6 or 7-membered ring compounds containing in their rings the —NH—CO-group, such as, for example, 1-vinyl - 2 - pyrrolidone, 1-vinyl-5-methyl-2-pyrrolidone, 1-vinyl - 5 - methyl-2-pyrrolidone, 1-vinyl - 2 - piperidone, N-vinyl - e - caprolactam, and the like. Depending upon the extent of polymerization, they have molecular weights ranging from at least 400 up to 2,000,000 or more. Viscosity measurements are commonly used as an indication of the average molecular weight of polymeric compositions, the instant polymers being characterized by a chain of carbon atoms to which the lactam rings are attached through their nitrogen atoms:

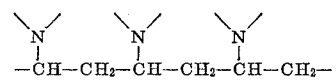

The K value (Fikentscher) of any particular mixture of polymers is calculated from viscosity data and is useful as an indication of the average molecular weight of such mixture. Its determination is fully described in "Modern Plastics," 23, No. 3, 157–61, 212, 214, 216, 218 (1945), and is defined as 1000 times $k$ in the empirical relative viscosity equation:

$$\frac{\log_{10} n_{\text{rel}}}{c} = \frac{75k^3}{1+1.5kC}+k$$

wherein C is the concentration in grams per hundred cc. of polymer solution and $n_{\text{rel}}$ is the ratio of the viscosity of the solution to that of pure solvent. The K values are reported as 1000 times the calculated viscosity coefficient in order to avoid the use of decimals. For the purpose of the present invention, there may be employed those polymeric N-vinyl lactams having a K value of about 10 to 200, preferably of 30 to 100 because of their viscosity at lower concentrations.

K values and specific viscosities ($n_{\text{sp}}$) are interconvertible and are related through relative viscosity ($\pi_{\text{rel}}$). Thus, when viscosity measurements are taken on solutions which have a concentration of 1.00 gram of polymer per deciliter of solution at 25° C. (c.=1), the relationships are as follows:

$$\pi_{rel} = n_{sp} + 1$$

Relative viscosity=specific viscosity plus one.
Relative viscosity=
$$10[0.001K + 0.000075K^2/(1+0.015K)]$$
Hence, $n_{sp}=$
$$-1 + 10[0.001K + 0.000075K^2/(1+0.0015K)]$$

Relative viscosity, specific viscosity and K are dimensionless, whereas inherent viscosity $$\frac{(\log_e n_{rel})}{C}$$

and intrinsic viscosity (the limit of inherent viscosity as C approaches zero) have the dimensions of dilution, i.e., the reciprocal of concentration. Intrinsic viscosity and K are intended to be independent of concentration.

The number of recurring polymer units enclosed by brackets in the foregoing general structural formula, indicated by "$n$," or the extent of degree of polymerization, corresponds to a chain of roughly 4 to 20,000 monomer units or more. In actual practice, a mixture of polymeric molecules, each containing a different number ($n$) of monomer units, is always produced. The polymers are readily prepared by the procedural steps given in U.S. Pats. 2,265,450, 2,317,804, and 2,335,454 and in which working examples of all the species characterized by the above formula are given and all of which are incorporated herein by reference thereto.

While not wishing to be bound by any particular theory or mechanism of reaction, it is believed that the arrangement of the monomeric units, that is, the styrene and isoprene monomers, is an important part of the invention in relation to the polymeric N-vinyl lactam. With respect to the interpolymers of the present invention, the units of styrene and isoprene are not situated in the main polymer chain but rather they form side chains on the preformed N-vinyl lactam, such as polyvinyl pyrrolidone, which forms the skeletal chain for the addition of the styrene and isoprene.

As pointed out above, it is believed that the arrangement of the monomer units in the final graft terpolymer structure, as side chains composed of units of styrene and isoprene attached to the skeletal chain of the preformed N-vinyl lactam such as, polyvinyl pyrrolidone, represents an important aspect of the present invention and as such, the novel graft terpolymers can be readily and conveniently prepared by subjecting a suitable mixture of an N-vinyl lactam, such as poly N-vinyl pyrrolidone, styrene and isoprene to polymerization conditions whereby vinyl-type polymerization occurs through the ethylenically unsaturated groups. Such means of vinyl-type polymerizations are well known in the art and include inducing means for initiating polymerization such as the use of high energy radiation including gamma radiation, X-rays and the like or by the use of a free radical type catalyst such as a free radical producing redox-system which is preferred.

For the preparation of the graft terpolymers of the invention, the monomers are introduced into the reaction system along with the polymeric N-vinyl lactam, such as poly N-vinyl pyrrolidone. Where permissible, it is preferred to carry out the reaction by dissolving or dispersing the reactants in an aqueous solution in the desired concentrations in the presence of a catalyst for initiation of polymerization. In addition to free radical producing redox catalyst systems, which are preferred for use herein, other catalysts can be employed and include per- compounds such as organic and inorganic peroxides, for example, benzoyl peroxide, cumene hydroperoxide, hydrogen peroxide, acetyl peroxide, lauroxyl peroxide or persulfates such as alkali metal persulfates; such as sodium and potassium persulfates, ammonium persulfate and the like; perborates such as sodium, potassium and ammonium perborates as well as azobis-nitriles, such as azo bisisobutyronitrile. If desired mixtures of catalyst can be employed.

The catalyst concentration in the reaction system is not necessarily a critical feature of the invention. The amount of catalyst can be varied over a wide range, but advantageously, an amount of catalyst of from about 0.01 to 2.0 weight percent or more can be employed based on the total weight of reactants being polymerized.

The temperature at which the reaction is advantageously carried out can be varied over a wide range of from about 30° C. and lower to about 80° C. and higher, however, it is preferred to conduct the graft polymerization reacation at a temperature of about 50° C. in order to avoid an undesirably violent reaction. Graft polymerization temperatures of about 50° C. provide products having the desirable physical characteristics of latex viscosity and molecular weight.

The graft polymerization reaction is normally carried out in a reaction vessel under the pressure of the monomers at any given reaction temperature, however, if desired, the pressure may be increased by the introduction of an inert gas such as nitrogen or argon and the like. Additionally, the reaction is preferably carried out in the absence of free oxygen in order to provide optimum conditions for the graft polymerization reaction.

If desired, an activating agent such as an alkali metal sulfite or bisulfite, e.g., sodium potassium, etc., sulfites and metabisulfites can be added to the polymerization reaction mixture in about the same amount as the polymerization catalyst in which case lower polymerization temperatures may be used. Chain regulators such as hexyl, cetyl, dodecyl, myristyl, etc., mercaptans can also be employed in the polymerizations. Suitable surface-active agents include fatty acid soaps, fatty alcohol sulfates such as sodium lauryl sulfate, potassium lauryl sulfate, etc., alkali metal salts of aromatic sulfonic acids, e.g., sodium isobutylnaphthalene sulfonate, etc., sulfosuccinic esters, γ-stearaminopropyl, dimethyl-β-hydroxyethyl ammonium chloride, and the like.

The emulsions can be compounded with additives such as pigments, salts, wetting agents, resins, waxes and the like, thus providing a wide spectrum of products having wide industrial application.

It has also been found that stable emulsions of the class described above can be prepared without the use of emulsifying agents or protective colloids, although it has been observed that it is preferable to add such materials to the emulsion recipe in order to obtain high conversions and greater stability of the resultant emulsions.

The following example will serve to illustrate the practice of the invention:

EXAMPLE 1

Into a one-gallon stainless steel autoclave equipped with a 3-propeller gear driven agitator, gas inlet tube, thermocouple and manometer were introduced 360 parts of distilled water followed by the sequential addition of 130 parts of polyvinyl pyrrolidone having a Fikentscher K value of 30, dissolved in 500 parts of distilled water, 40 parts of Dresinate 214, potassium salt of rosin (Hercules Power Corp.), dissolved in 404.6 parts of distilled water, 200 parts of styrene, 0.136 part of ferric sulfate dissolved in 10 parts of distilled water, 12.0 parts of sodium pyrophosphate decahydrate dissolved in 200 parts of distilled water, 4.0 parts of t-dodecyl mercaptan, 0.488 parts of sodium hydroxide dissolved in 10 parts of distilled water and 4.0 parts of sorbose dissolved in 20 parts of distilled water.

The system was purged thoroughly with nitrogen whereupon 600 parts of isoprene and 1.68 parts of cumene hydroperoxide were added. The mixture was stirred at room temperature for thirty minutes and subsequently heated to a temperature of 50° C. over a one-hour period and maintained thereat for ten hours. At the end of the reaction period, the autoclave was cooled to room temperature and vented with nitrogen. From the autoclave, there was recovered the graft terpolymer of polyvinyl pyrrolidone, styrene and isoprene in the form of an emulsion which was filtered through cheese-cloth in order to remove traces of prefloc formed. The graft terpolymer emulsion provided the following analysis:

Total solids, percent _____ 36.9
Residual monomer, percent _____ 1.36
Conversion, percent _____ 95.8
Brookfield visc. (cps.) _____ 2430

The graft terpolymer was dissolved in a solvent, such as dimethyl formamide, and cast upon a support. After drying to remove solvent there remained a film which was colorless, flexible and water-resistant.

In a similar manner, other polymeric N-vinyl lactams, of the class described, supra, can be employed in place of the poly N-vinyl pyrrolidone of Example 1, with similar obtaining.

Reference in the specification and claims to parts, proportions and percentages, unless otherwise specified, refer to parts, proportions and percentages by weight.

Since it is obvious that numerous changes and modifications can be made in the above-described details without departing from the spirit and nature of the invention, it is to be understood that all such changes and modifications are included within the scope of the invention and that the invention is not limited to the exemplary details set forth by way of example, except as set forth in the appended claims or as necessitated by the effect of the prior art.

We claim:
1. A stable emulsion comprising water and a graft polymer on a poly (N-vinyl lactam) corresponding to the formula:

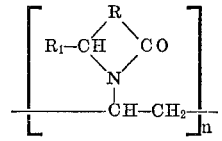

wherein R represents an alkylene bridge group containing from 2 through 4 carbon atoms, $R_1$ represents a member selected from the group consisting of hydrogen, alkyl, aryl, alkaryl and aralkyl groups, $n$ represents a positive integer and wherein the grafted side chains contain units of isoprene and styrene.

2. A stable emulsion according to claim 1 wherein the N-vinyl lactam is N-vinyl pyrrolidone.

3. An emulsion according to claim 1 wherein the ratio of N-vinyl lactam and the comonomers is from 10/90 to 99/1.

4. The emulsion according to claim 1 wherein the ratio of isoprene and styrene is from 1/99 to 99/1.

No references cited.

MORRIS LIEBMAN, Primary Examiner

T. DE BENEDICTIS, Sr., Assistant Examiner

U.S. Cl. X.R.
260—29.7 T, 857